No. 706,087. Patented Aug. 5, 1902.
H. McCORNACK.
CENTRIFUGAL SEPARATOR.
(Application filed July 14, 1900.)
(No Model.) 2 Sheets—Sheet I.

No. 706,087. Patented Aug. 5, 1902.
H. McCORNACK.
CENTRIFUGAL SEPARATOR.
(Application filed July 14, 1900.)
(No Model.) 2 Sheets—Sheet 2.
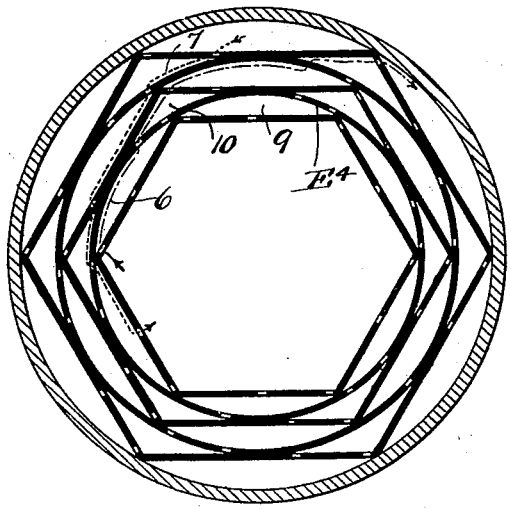
Fig. 3.
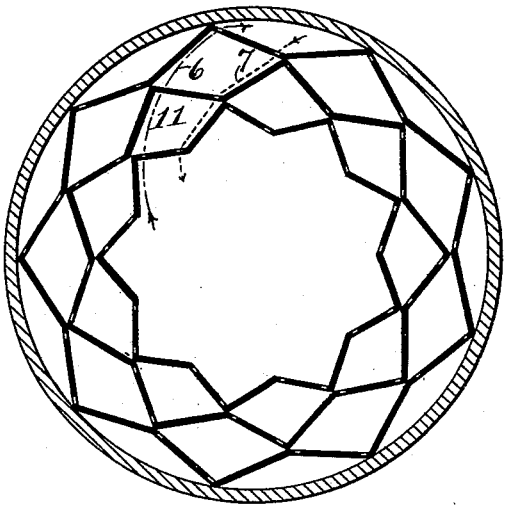
Fig. 4.
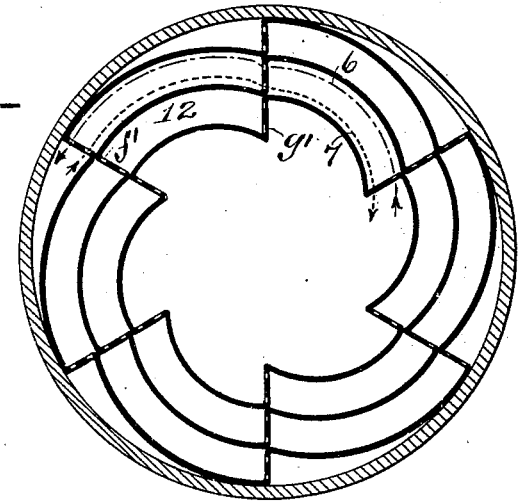
Fig. 5.
Witnesses 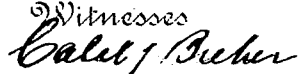
Herbert McCornack
Inventor
by 
Attorney

UNITED STATES PATENT OFFICE.

HERBERT McCORNACK, OF WESTCHESTER, PENNSYLVANIA.

CENTRIFUGAL SEPARATOR.

SPECIFICATION forming part of Letters Patent No. 706,087, dated August 5, 1902.

Application filed July 14, 1900. Serial No. 23,587. (No model.)

*To all whom it may concern:*

Be it known that I, HERBERT MCCORNACK, a citizen of the United States of America, and a resident of Westchester, in the county of Chester and State of Pennsylvania, have invented certain new and useful Improvements in Centrifugal Separators, of which the following is a specification.

My invention relates to centrifugal liquid-separators, and more particularly to dividing the liquid-space of the rotary separator vessel by means of inserted partitions, so as to facilitate the separation of the constituent parts of the liquid, commonly cream and skim-milk.

The main object of my invention is to form in the vessel a number of complete separating-compartments, each one of which will be in skim-milk communication with a compartment located at a greater distance from the center of rotation and also in cream communication with another compartment located nearer said center, and the said communicating compartments forming jointly continuous passage-ways between the outer and inner walls of the liquid for inwardly and outwardly flowing streams of cream and skim-milk, respectively, to which oppositely-flowing streams each compartment adds its contribution of each constituent. This I accomplish in a simple and effective manner, which is fully described in connection with the accompanying drawings, which show a preferred construction embodying my invention, the novel features of which are particularly pointed out in the claims.

Figure 1:
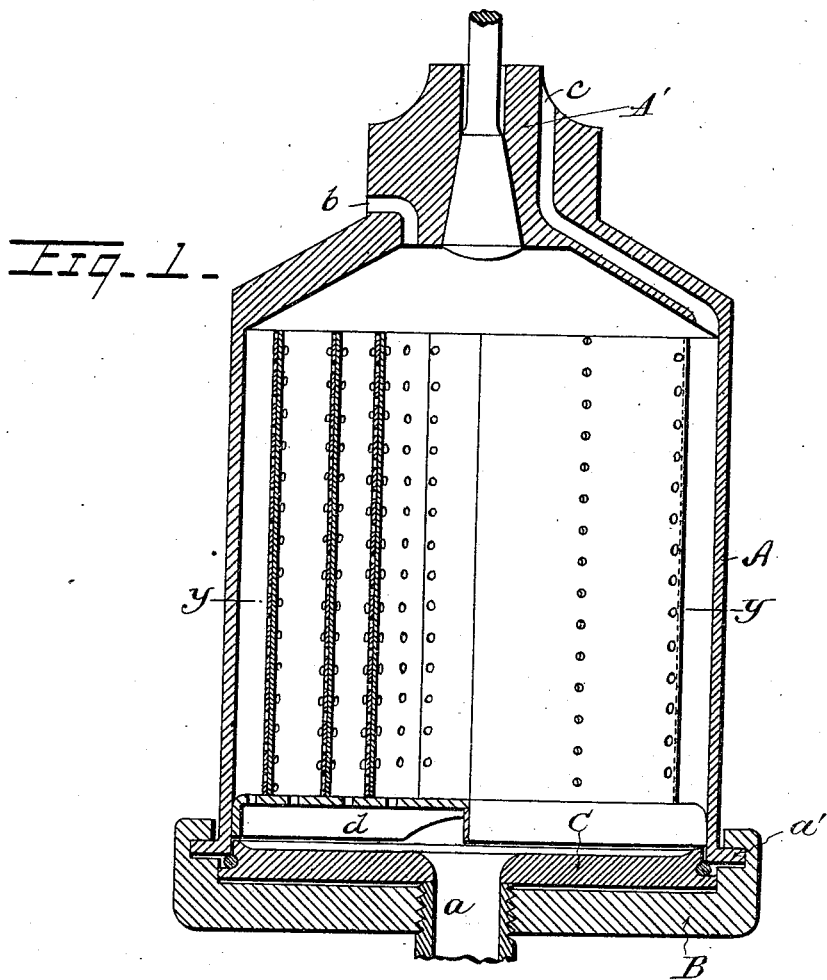
Figure 2:
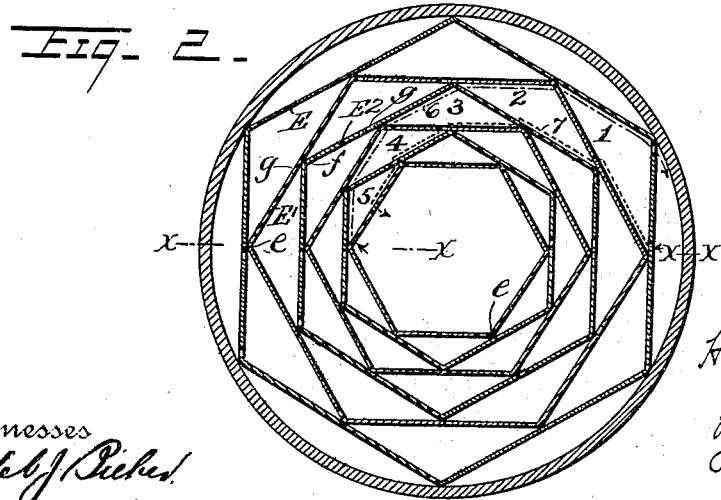

Figure 1 is a sectional elevation of a separator vessel having my improvements applied thereto, the section being taken on the line $x\ x$ of Fig. 2. Fig. 2 is a cross-sectional view taken on the line $y\ y$ of Fig. 1. Figs. 3, 4, and 5 indicate some modifications of the preferred construction.

A represents an ordinary cylindrical separator vessel having any suitable inlet, as $a$, for the milk, outlets $b$ and $c$ in the closed end A' of the vessel for the cream and skim-milk, respectively, and any suitable closure for the open end of the vessel, comprising, as shown, a cap-piece B, adapted to engage or disengage flange-like projections A' on the vessel, and a joint-plate C, with means for pressing the latter to its seat, though any preferred construction may be employed for the ends of the vessel without affecting my present invention.

The division-plates in my improved construction are preferably made up in the form of polygonal partitions or hollow prisms E E' E², adapted to fit one within the other, as indicated in Fig. 2, the angular edges $e$ of each prismatic partition being, as shown, in contact with a side of the adjacent outer partition, thereby forming two or more concentric circular series of compartments extending lengthwise of the bowl, each compartment of which overlaps adjacent compartments respectively nearer to and farther from the center of rotation. Each of these overlapping compartments is adapted to serve as a separate separating-chamber, receiving a supply of milk from the inlet space or chamber $d$ and delivering the separated constituents respectively into outer and inner overlapping partitions through skim-milk apertures $f$ and cream-apertures $g$, located respectively at points relatively far from and near to the center of rotation of the vessel, such compartment thus serving at the same time as a complete separating-chamber in itself and also as part of a distinctly-maintained passage-way for the oppositely-flowing streams of skim-milk and cream delivered to it from the communicating compartments, to whose volume it adds *en passant* the respective amounts of skim-milk and cream separated in such compartment. Referring to Fig. 2, the series of communicating compartments 1, 2, 3, 4, and 5 jointly form a double passage-way between the inner and outer walls of the liquid operated on for the currents of skim-milk and cream, (respectively indicated by the different dotted lines 6 and 7,) to each of which currents each of said compartments delivers its own separated constitutents for an easy and unobstructed movement toward or away from the center to its natural position in the vessel. Each of the separating compartments formed between the concentrically-arranged partitions, as shown, is provided with the outlets $f$ at the farthest convenient point from the center of rotation, so as to naturally discharge the skimmed or partially-skimmed milk therefrom into the adjoining outer compartment of the series, as 1 to 5, thus serving also as an inlet to said outer compartment, while the cream-outlets $g$ are at the nearest convenient point to the center of rotation to discharge into the adjoining inner compartment of said series.

In the modified construction indicated in Fig. 3 the form of the separating-compartments 9 and 10 is substantially triangular, as shown in Fig. 2, cylindrical partitions, however, $E^4$, being arranged alternately with the polygonal or prismatic partitions already described. In Fig. 4 the walls of the partitions are represented as longitudinally corrugated, so as to form compartments 11 of slightly different cross-section, but obviously similar in effect. In Fig. 5 the compartments 12, formed between the eccentric or spiral faces of the partition, have the milk-outlets $f'$ located at one end, as it were, of the compartment and the cream-outlet $g'$ at the other end, which latter, it will be seen, is nearer the center of rotation. The separation taking place in each compartment and the movement of the cumulated products therethrough is the same as already described. Other modifications may be readily devised.

What I claim is—

1. In a centrifugal liquid-separator, two or more vertical walled partitions concentrically arranged therein in contact with each other at intervals to form a circular series of separating compartments between each of the said partitions and the contacting inner or outer one, each of said compartments having skim-milk openings in two of its walls and also cream-openings in two of its walls and said openings providing jointly separate outward and inward flow passages through adjoining inner and outer compartments, substantially as described.

2. In a centrifugal liquid-separator, two or more vertical walled partitions of angular cross-section concentrically arranged in contact with each other at intervals to form a circular series of separating compartments between them, each of said compartments having skim-milk openings in two of its walls and also cream-openings in two of its walls and said openings providing jointly separate outward and inward flow passages through adjoining inner and outer compartments, substantially as described.

Signed by me at Westchester, Pennsylvania, this 8th day of June, 1900.

HERBERT McCORNACK.

Witnesses:
CHANNING WAY,
W. G. STEWART.